(12) United States Patent
Altshuler et al.

(10) Patent No.: US 9,597,570 B2
(45) Date of Patent: Mar. 21, 2017

(54) BATTING SIMULATOR SYSTEM

(71) Applicant: InMotion Systems, LLC, Westborough, MA (US)

(72) Inventors: Yury Altshuler, Needham, MA (US); Michael Anthony Donfrancesco, Westborough, MA (US); Thomas George Stepsis, Watertown, MA (US)

(73) Assignee: INMOTION SYSTEMS, LLC, Westborough, MA (US)

( * ) Notice: Subject to any disclaimer, the term of this patent is extended or adjusted under 35 U.S.C. 154(b) by 300 days.

(21) Appl. No.: 13/739,769

(22) Filed: Jan. 11, 2013

(65) Prior Publication Data

US 2013/0218308 A1 Aug. 22, 2013

Related U.S. Application Data

(60) Provisional application No. 61/586,421, filed on Jan. 13, 2012.

(51) Int. Cl.

| A63B 69/00 | (2006.01) |
| G06F 19/00 | (2011.01) |
| G09B 19/00 | (2006.01) |
| A63B 24/00 | (2006.01) |
| A63B 71/06 | (2006.01) |

(52) U.S. Cl.
CPC .......... *A63B 69/0002* (2013.01); *G06F 19/00* (2013.01); *G09B 19/0038* (2013.01); *A63B 2024/0031* (2013.01); *A63B 2024/0056* (2013.01); *A63B 2024/0096* (2013.01); *A63B 2069/0006* (2013.01); *A63B 2069/0008* (2013.01); *A63B 2071/065* (2013.01); *A63B 2071/0638* (2013.01); *A63B 2220/05* (2013.01); *A63B 2220/13* (2013.01); *A63B 2220/30* (2013.01)

(58) Field of Classification Search
CPC ........ A63B 69/0002; A63B 2069/0006; A63B 2069/0008; A63B 2024/0096; A63B 2071/0638; A63B 2220/05
USPC .......................................................... 700/91
See application file for complete search history.

(56) References Cited

U.S. PATENT DOCUMENTS

| 5,443,260 | A | * | 8/1995 | Stewart et al. ............... 473/451 |
| 5,846,139 | A |   | 12/1998 | Bair et al. |
| 5,882,269 | A | * | 3/1999 | Lewis ................ A63B 69/3623 434/252 |
| 7,335,116 | B2 |  | 2/2008 | Petrov |
| 7,544,137 | B2 |  | 6/2009 | Richardson |
| 2002/0176000 | A1 | * | 11/2002 | Katayama .......... H04N 7/17318 348/157 |

(Continued)

*Primary Examiner* — Damon Pierce
(74) *Attorney, Agent, or Firm* — Nutter McClennen & Fish LLP; Rory P. Pheiffer; Santiago Velez

(57) ABSTRACT

In response to detecting a user hitting a pitched ball, a batting simulator system is configured to provide data such as batting average, slugging percentage, and exit ball velocity and distance in real-time. Furthermore, the batting simulator system can both display a trajectory of the hit ball in a virtual stadium and provide the results of the ball hit (e.g., groundout, double, home run, etc.) in real-time. The batting simulator system can store and later output these results to the player to allow the player or a coach to identify hitting tendencies and optimize swing mechanics over the course of one hitting session or over an entire season.

31 Claims, 7 Drawing Sheets

(56) References Cited

U.S. PATENT DOCUMENTS

| | | | | |
|---|---|---|---|---|
| 2005/0113158 | A1* | 5/2005 | Sterchi | A63F 13/10 463/3 |
| 2007/0265043 | A1* | 11/2007 | Wang et al. | 463/2 |
| 2010/0255939 | A1* | 10/2010 | York | 473/451 |
| 2010/0298958 | A1* | 11/2010 | Connelly | 700/93 |
| 2012/0115556 | A1* | 5/2012 | Sogabe | A63F 13/10 463/3 |

* cited by examiner

BATTING SIMULATOR SYSTEM

RELATED APPLICATIONS

This patent application claims the benefit of U.S. Provisional Application No. 61/586,421, filed on Jan. 13, 2012, entitled, "Batting Simulator System," the contents and teachings of which are hereby incorporated by reference in their entirety.

BACKGROUND

Baseball is a game that relies heavily on statistics. For example, the possibility of a player making the Hall of Fame can depend upon mere percentage points when looking at the player's career batting average. Additionally, statistics are used to assess a player's skill and are reviewed in great detail when determining if the player is able to reach higher levels of expertise. A player's ability to improve his performance and the associated statistics over the course of a season or career will greatly enhance the probability of his success at a variety of levels.

Over the past few decades, there has been a transformation in the way children and young adults practice and play baseball. Rather than gathering around the local sandlot, a number of ball players, for both baseball and softball, now receive professional instruction from experienced coaches at local indoor baseball facilities. With respect to hitting, conventional indoor baseball facilities offer year round clinics utilizing batting cages and pitching machines to improve the players' swing mechanics, bat speed, and ability to hit the ball on the sweet spot of the bat. As a result, the indoor baseball facilities can help to improve the players' batting average.

SUMMARY

In conventional baseball facilities, players take batting practice in batting cages that are 70 feet long by 12 feet wide and often hit balls into screens that are placed in relatively close proximity to the player. While coaches often manually chart the number of hard hit balls during the batting session, the coaches do not have a mechanism available to quantitatively measure the end result of the batted ball. For example, based upon the dynamics of the hit ball, the coach cannot quantitatively measure whether the hit results in a line drive double in the gap or fly ball to the left fielder. Knowledge of the metrics behind the batted ball can assist the coach in assessing the progress of a hitter and can increase the player's interest in the game and batting confidence.

Electronic batting simulators that measure the motion of a batted ball have been previously developed, but have failed to reach general commercial availability because of relatively high costs and impractical hardware configurations. For example, conventional batting simulators include a series of optical sensors that detect the passage of a batted ball through a plurality of relatively large detection planes and a computerized device electrically coupled to the optical sensors configured to calculate the projected trajectory and velocity of the batted ball. The computerized device of the conventional batting simulator can generate graphics of a baseball game played in response to the batted ball and can display the projected flight of the batted ball relative to the baseball game graphics. However, the proposed conventional batting simulators, similar to manual charting methods, lack a mechanism available to quantitatively measure the end result of the batted ball (e.g., whether a line drive was a double in the gap or fly ball to the left fielder) which can be used in assessing the progress of a hitter.

By contrast to conventional batting systems, embodiments of the present innovation relate to a batting simulator system. In one arrangement, in response to a user hitting a pitched ball, the batting simulator system is configured to measure the exit velocity and trajectory of the batted ball and, in combination with a system performance metric, provide the outcome or result of the ball hit (e.g., ground out, double, home run, etc.) in real-time. For example, the system performance metric can relate to a performance metric of a virtual fielder, such as the fielder's reaction time, running speed, and arm or throwing strength, a performance metric of the hitter, such as the hitter's running speed, and/or an environmental factor associated with a virtual playing field, such as wind direction, humidity level, and temperature. The player's individual performance metrics can be based on the player's age and/or gender, for example, and can be used in factoring the likely outcome of a hit. The system can also incorporate actual real-world performance metrics for a hitter based upon data entered into the system by the hitter or the coach.

As the batting simulator system collects exit ball velocity, ball trajectory, and outcome data, the system is configured to provide data such as batting average, exit ball velocity, and distance of batted ball in real-time via an output device such as a monitor. Additionally, the batting simulator system can display a virtual stadium as well as the trajectory and outcome of the batted ball within the virtual stadium. Furthermore, in one arrangement, the batting simulator system can store the results in a database and later compile and output these results to the user to allow the user or a coach to identify hitting tendencies over the course of one hitting session or over an entire season. The coach or hitter can utilize this data to optimize the hitter's swing mechanics with the goal of improving performance.

In one arrangement, the computerized device is configured as a gaming module. For example, with the outcome data of the batted ball being collected by the computerized device in real-time, the computerized device can be utilized by players and/or teams to compete against a computerized defense. In one arrangement, the defense can use algorithms based on artificial intelligence gathered from generally accepted baseball strategies and tactics to determine the correct defensive play for any given circumstance. For example, the computerized device can determine if the defense should execute a double play with base runners on first and second rather than prevent the base runner on second base to advance to third.

In one arrangement, in a batting simulator system having a set of cameras and a computerized device disposed in electrical communication with the set of cameras, embodiments of the innovation relate to a method for detecting a result of the ball hit. The method includes receiving, by the computerized device, a set of measurements of a ball associated with a ball hit, detecting, by the computerized device, a trajectory and exit ball velocity of the ball based upon the set of measurements, combining, by the computerized device, the detected trajectory and exit ball velocity with a system performance metric to generate a virtual ball hit outcome, and outputting, by the computerized device, the virtual ball hit outcome on an output device.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

In response to a user hitting a pitched ball, the batting simulator system is configured to measure the exit velocity and trajectory of the batted ball and, in combination with a system performance metric, provide the outcome or result of the ball hit (e.g., ground out, double, home run, etc.) in real-time. For example, the system performance metric can relate to a performance metric of a virtual fielder, such as the fielder's reaction time, running speed, and arm or throwing strength, a performance metric of the hitter, such as the hitter's running speed based upon the user's age, and/or an environmental factor associated with a virtual playing field, such as wind direction, humidity level, and temperature. As the batting simulator system collects exit ball velocity, ball trajectory, and outcome data, the batting simulator system is configured to provide data such as batting average, slugging percentage, and exit velocity of the ball in real-time via an output device such as a monitor. Additionally, the batting simulator system can display a virtual stadium and as well as the trajectory of the batted ball and outcome of the ball hit in the stadium. Furthermore, in one arrangement, the batting simulator system can store and later output these results to the user to allow the user or a coach to identify hitting tendencies and optimize swing mechanics over the course of one hitting session or over an entire season.

Figure 1:
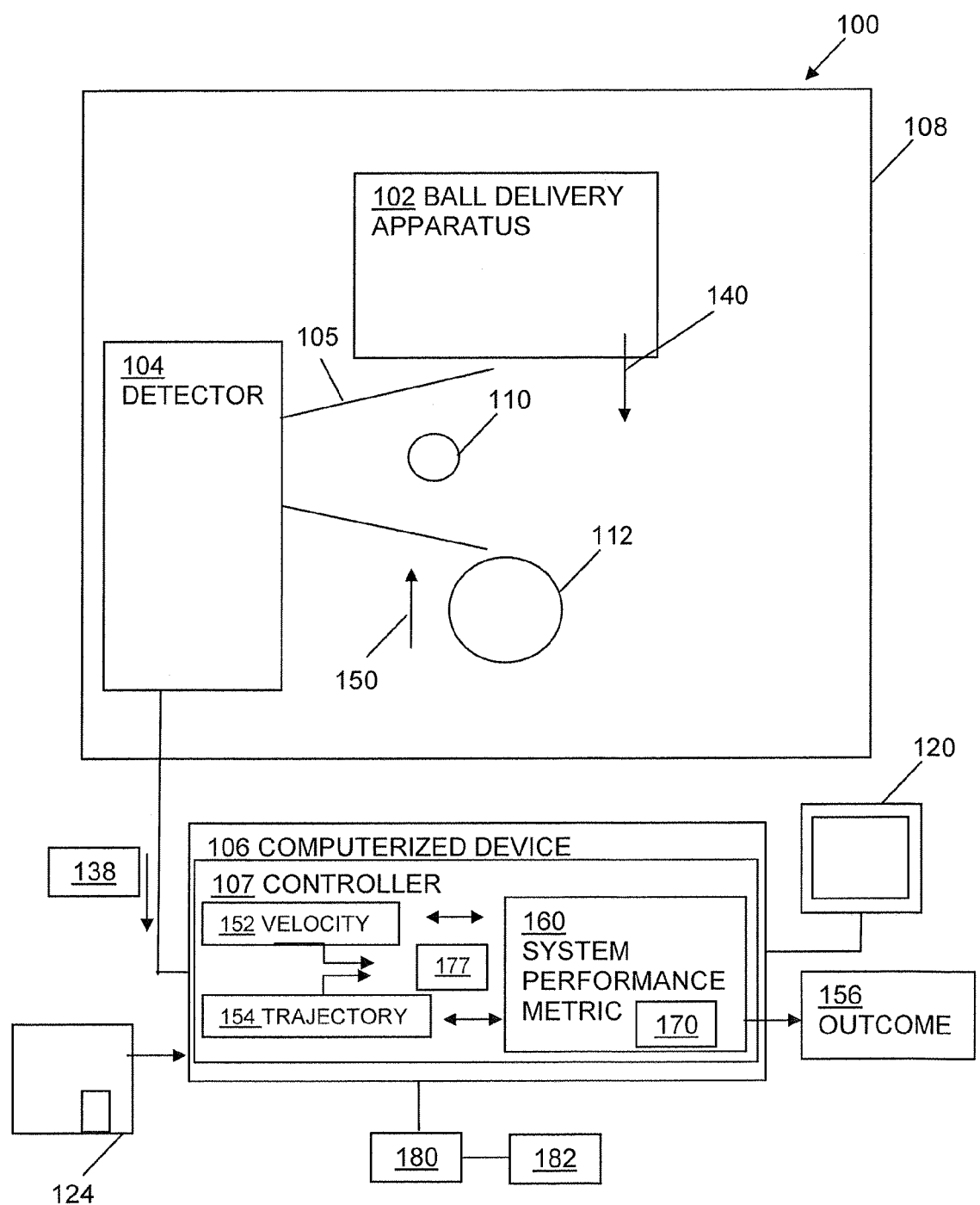
FIG. 1 illustrates an overhead view of a schematic representation of a batting simulator system, according to one embodiment.

FIG. 1 illustrates an overhead view of a schematic representation of a batting simulator system 100, according to one arrangement. The batting simulator system 100 includes a ball delivery apparatus 102, such as a pitching machine or live pitcher, and a detector 104 disposed in electrical communication with a computerized device 106. As illustrated, the ball delivery apparatus 102 and the detector 104 can be disposed inside or outside of a batting cage or screen 108.

The detector 104, in one arrangement, is configured to capture a set of images of a ball 110, such as a baseball, as the ball delivery apparatus 102 delivers the ball 110 to a user or hitter 112 and the user 112 hits the ball 110. The detection 104 is also configured to generate a set of measurements associated with the captured image and related to the motion of the ball 110.

Figure 2:
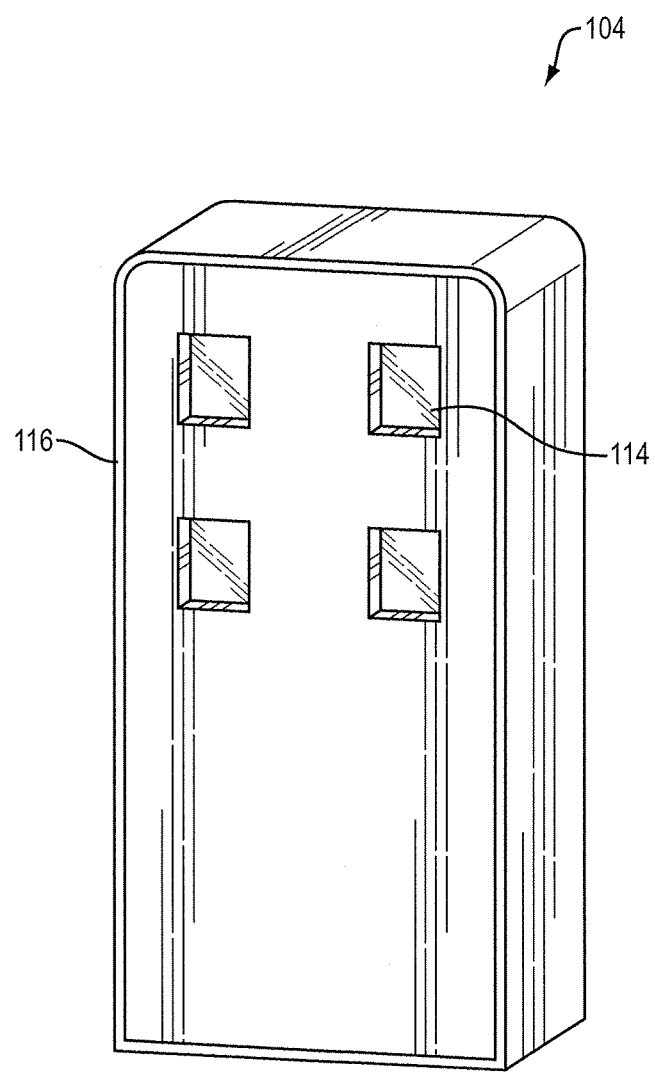
FIG. 2 illustrates an example detector of the batting simulator system of FIG. 1, according to one arrangement.
Figure 3B:
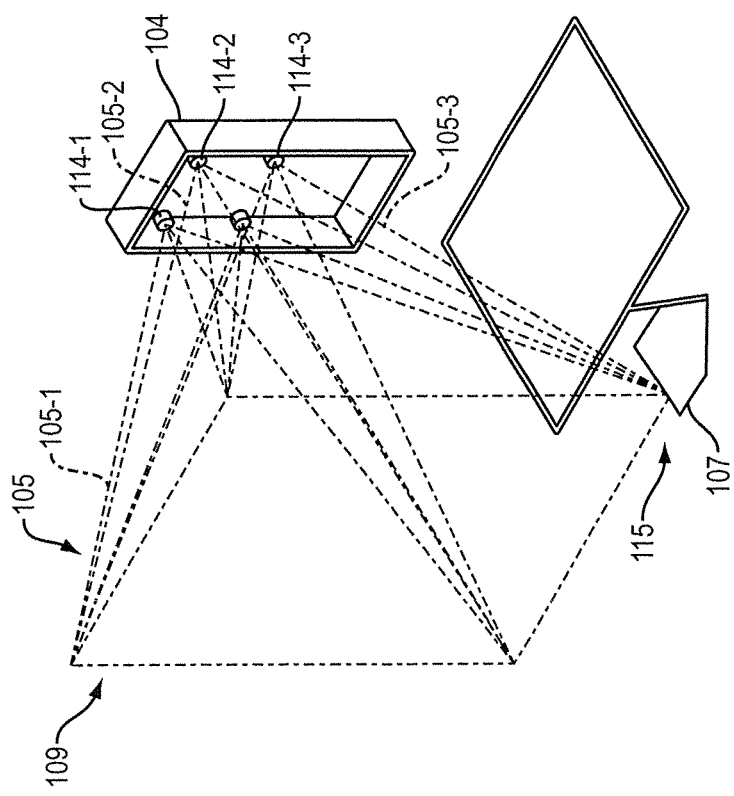
FIG. 3B illustrates a perspective view of the detector of FIG. 2.
Figure 3A:
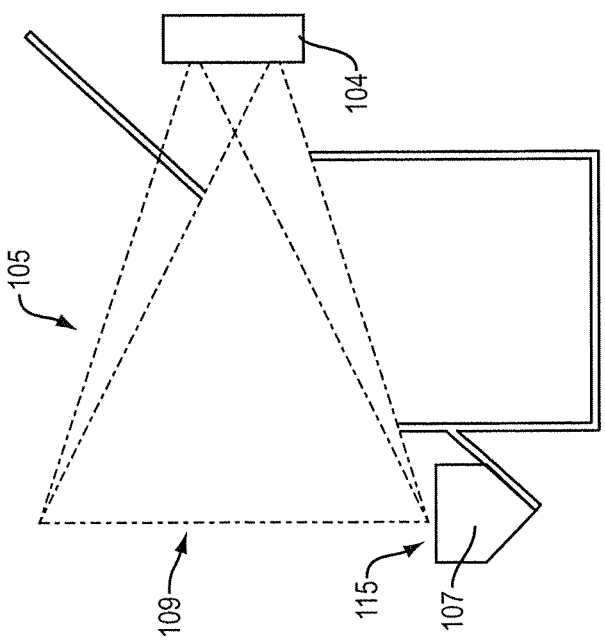
FIG. 3A illustrates an overhead view of the detector of FIG. 2.

In one arrangement, as indicated in FIG. 2, the detector 104 includes a set of cameras 114, such as infrared (IR) cameras, mounted on a rigid frame 116. With reference to FIGS. 3A and 3B, each camera of the set of cameras 114 includes overlapping field of views (FOVs) 105 to capture multiple images of the ball 110 as a result of a user hit. For example, a first camera 114-1 is configured to capture an image in a first field of view 105-1, a second camera 114-2 is configured to capture an image in a second field of view 105-2, and a third camera 114-3 is configured to capture an image in a third field of view 105-3. Taken together, the field of views 105 define a tracking volume 109.

With the cameras 114 mounted in a single compact frame 116, the detector 104 can be positioned relative to user 112 in a relatively short amount of time and in such an orientation that the system 100 can capture data for either a right-handed batter, as shown in FIG. 1, or a left-handed batter. For example, the tracking volume 109 of the detector 104 can be disposed in proximity to a leading edge 115 of home plate 107. Accordingly, with such positioning of the tracking volume 109, the detector 104 can track and collect data for baseballs hit by right-handed or left-handed batters.

Returning to FIG. 1, the computerized device 106, such as a computer having controller 107 including a memory and a processor, is disposed in electrical communication with the detector 104. As will be described in detail below, the controller 107 is configured to receive a set of measurements 138, such as images, of the ball 110 from the detector 104 and detect the trajectory and exit velocity of the ball 110 based upon the set of measurements 138.

In one arrangement, the controller 107 stores a batting simulator application that, when executed by the controller 107, causes the controller 107 to perform the operation of detecting a result of the ball hit. The batting simulator application installs on the computerized device 106 from a computer program product 124. In certain arrangements, the computer program product 124 is available in a standard off-the-shelf form such as a shrink wrap package (e.g., CD-ROMs, diskettes, tapes, etc.). In other arrangements, the computer program product 124 is available in a different form (e.g., propagated signals, a network installation, purchasable and downloadable online media, etc.). In another arrangement, the memory in the computerized device 106 includes an identifier or address, in the form of a URL or the like, which when provided to the computerized device 106 allows the computerized device 106 to acquire the response application from an on-line repository of applications compatible with the computerized device 106.

Figure 4A:
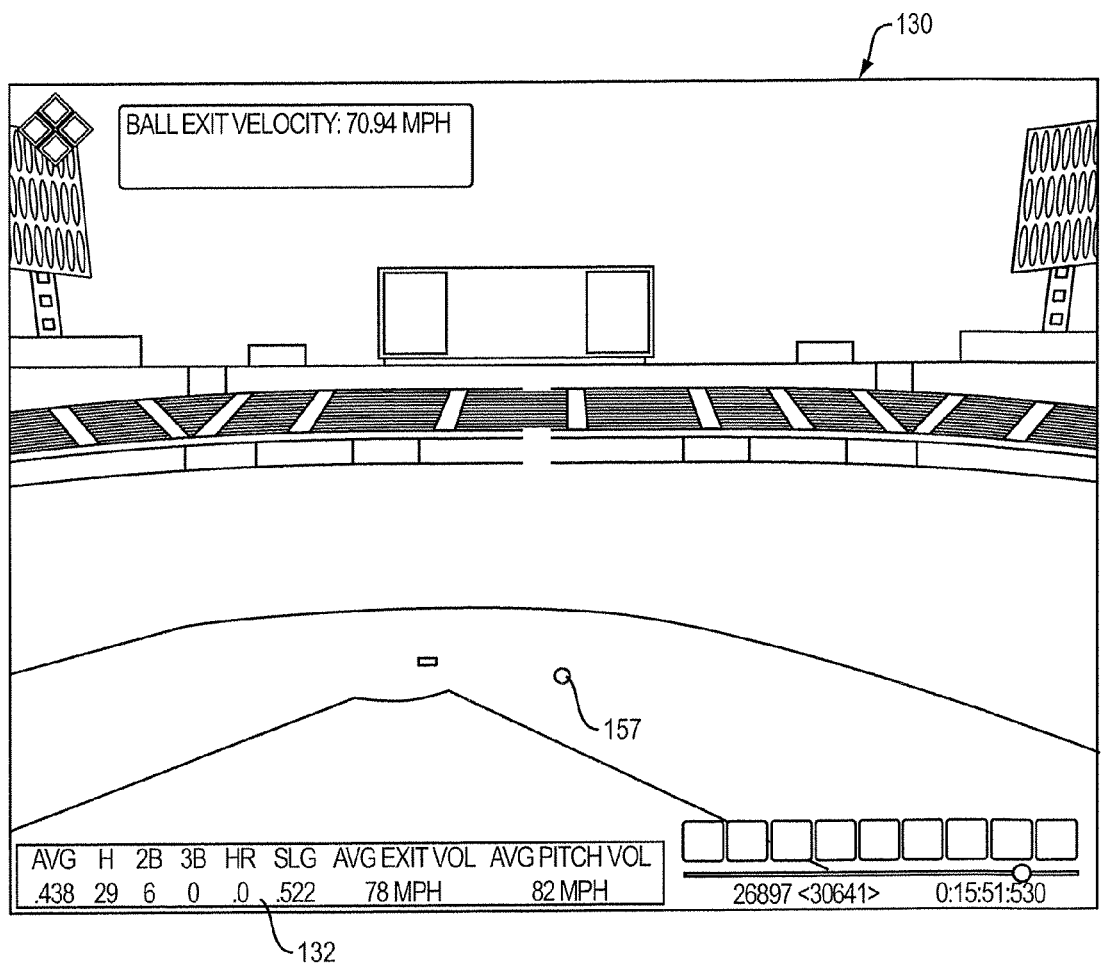
FIG. 4A illustrates a simulated three-dimensional display of a field provided by the batting simulator system of FIG. 1, according to one arrangement.
Figure 4B:
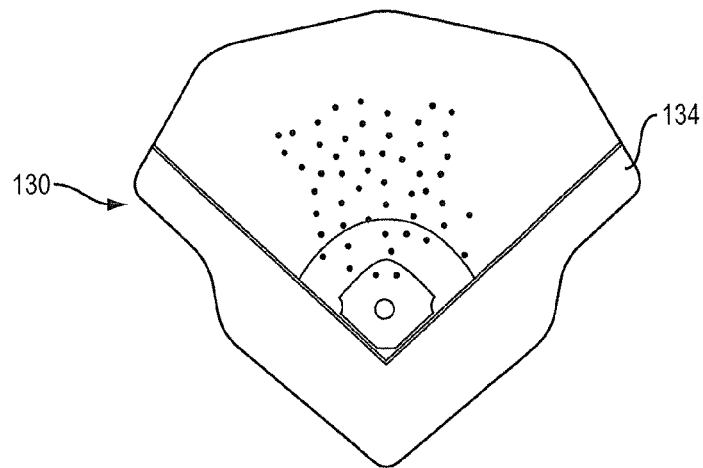
FIG. 4B illustrates an overhead display of a field provided by the batting simulator system of FIG. 1, according to one arrangement.

The computerized device 106 is disposed in electrical communication with an output device, such as a monitor 120. As will be described in detail below, the monitor 120 can provide a display of a virtual field 130, as illustrated in FIGS. 4A and 4B. For example the display 130 of the virtual field can include both a simulated three-dimensional (3D) view of the field 132 (FIG. 4A) and an overhead view 134 (FIG. 4B) of the field. While the output device 120 can be configured in a variety of ways, in one arrangement the output device 120 and the computerized device 106 are housed in a common portable kiosk to allow for easy transport.

Returning to FIG. 1, the computerized device 106 is configured to detect both the incoming ball speed and ball trajectory, such as provided by the ball delivery apparatus 102, and the outgoing ball speed (i.e., exit ball velocity) and ball trajectory after the ball 110 is hit by the user 112. As will be described in detail below, based upon the exit ball velocity, trajectory, and a system performance metric, the batting simulator system 100 can provide the user 112 with the direction and distance of travel of the ball 110 as well as predict the outcome of the hit ball, as in a real-life game scenario.

In use, the computerized device 106 initially receives a set of measurements 138 of a ball 110 associated with a ball hit. For example, during operation, the ball delivery apparatus 102 delivers the ball 110 to the user along direction 140 and in response to a ball hit, the ball travels along a generally opposing direction 150. The cameras 114 of the detector 104 capture and transmit images or measurements 138 of the ball 110 to the computerized device 106 as the ball 110 travels along direction 150 in response to the ball hit.

Based upon the images or measurements 138, the computerized device 106 detects the exit ball velocity 152 and the trajectory 154 (i.e., a first angle of the ball relative to a horizontal reference and a second angle of the ball relative to a vertical reference, such as a vertical reference associated with the user 112) of the ball 110. For example, the computerized device 106 can be configured to utilize image processing techniques that are known in the art to detect the exit ball velocity 152 and the trajectory 154 based upon the received images or measurements 138.

With the exit ball velocity 152 and trajectory 154 of the ball 110 known after impact, the computerized device 106 can determine a virtual ball hit outcome 156 associated with the ball hit. For example, the computerized device 106 can initially detect the direction of travel of the ball and at least one of the horizontal or vertical distance of travel of the ball using a range of trajectory algorithms.

In one arrangement, the following equation provides the horizontal distance the batted ball travels after impact:

$$d = \frac{v\cos\theta}{g}\left(v\sin\theta + \sqrt{(v\sin\theta)^2 + 2gy_0}\right)$$

where the variables are provided as:
  g: the gravitational acceleration;
  θ: the angle at which the batted ball is launched;
  v: the exit ball velocity after impact;
  $y_0$: the initial height of the ball at impact; and
  d: the total horizontal distance travelled batted ball.

Based upon the exit ball velocity 152 and trajectory 154 and as indicated in FIGS. 1 and 4A, the computerized device 106 can determine a virtual endpoint location 157 of the hit ball (i.e., a virtual hit ball), such as if the horizontal distance travelled by the hit ball results in a ground ball to the second baseman or a deep fly to centerfield. For example, in the case where the exit ball velocity 152 is relatively low and the trajectory 154 is relatively shallow, the computerized device 106 can detect virtual distance travelled (d) by the hit ball as being relatively short. Accordingly, based upon the detected distance, the computerized device 106 can detect the virtual endpoint location 157 of the virtual ball as being an infield location and can classify the virtual ball hit outcome 156 as being a ground ball. However, in the case where the exit ball velocity 152 is relatively high and the trajectory 154 is relatively steep, the computerized device 106 can detect virtual distance travelled (d) by the hit ball as being relatively large. Accordingly, based upon the detected distance, the computerized device 106 can detect the virtual endpoint location 157 of the virtual ball as being an outfield location and can classify the virtual ball hit outcome 156 as being a deep fly to centerfield.

Additionally during use, the computerized device 106 is configured to combine the detected trajectory 154 and exit ball velocity 152 (e.g., the virtual endpoint location 157) with a system performance metric 160 to generate the virtual ball hit outcome 156 and to output the virtual ball hit outcome 156 on an output device 120. The computerized device 106 utilizes the system performance metric 160 to predict real-life outcome of the hit (e.g., if the hit is an out, single, or home run) based upon the received measurements 138. It should be noted that the computerized device 106 can be preconfigured with the system performance metrics 160, such as where the controller 107 stores the system performance metrics 160. Alternately, a user, such as a batter or a coach, can input the performance metric 160 into the computerized device 106 prior to, or while, the batter 112 hits balls 110 from the ball delivery apparatus 102.

The system performance metric 160 can be configured in a variety of ways. The following provides examples of various configurations of system performance metrics 160 utilized by the computerized device 106.

Figure 5:
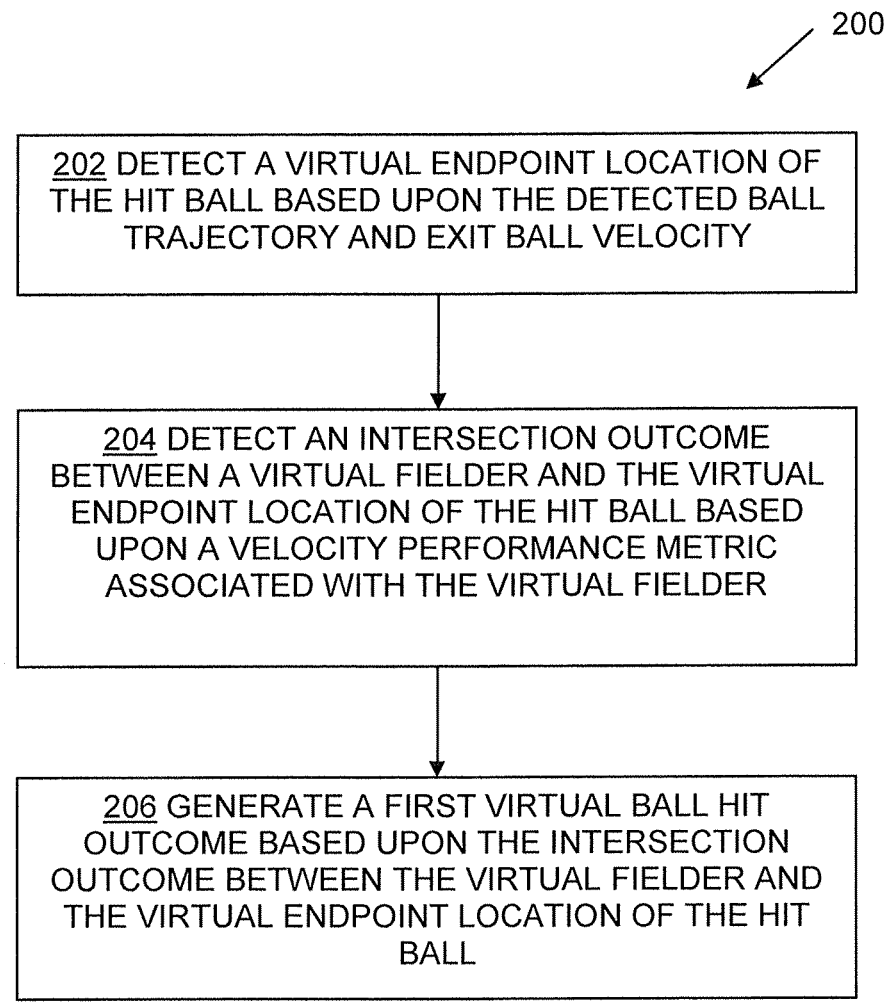
FIG. 5 is a flowchart of a procedure performed by the computerized device of FIG. 1, according to one arrangement.

In one arrangement, the system performance metric 160 can affect the virtual ball hit outcome of the batted ball. For example, the computerized device 106 applies a set of system performance metrics 160 associated with a virtual fielder to the exit velocity 152, trajectory 154, and/or an endpoint location of the hit ball to affect the virtual ball hit outcome 156 (e.g., whether a single, double, or out) of the hit. FIG. 5 is a flowchart 200 illustrating a process performed by the computerized device 106 when combining the detected trajectory 154 and exit ball velocity 152 with the system performance metric 160 to generate the virtual ball hit outcome 156.

In step 202 and as described above, the computerized device 106 detects a virtual endpoint location 157 of the hit ball based upon the detected ball trajectory 154 and exit ball velocity 152. For example, based upon the exit ball velocity 152 and trajectory 154, the computerized device 106 can determine the virtual endpoint location 157 of the hit ball as corresponding to a center field location.

In step 204, the computerized device 106 detects an intersection outcome between a virtual fielder and the virtual endpoint location 157 of the hit ball based upon a velocity performance metric associated with the virtual fielder. For example, the computerized device 106 can be configured with a database of fielder performance metrics associated with a virtual fielder, such as the virtual fielder's reaction time in response to a ball hit and running speed. By knowing the position (e.g., center field) of the virtual fielder, the reaction time and speed of the virtual fielder as the virtual fielder's performance metric 160, as well as the virtual endpoint location 157 of the hit ball (i.e., based upon the detected trajectory 154 and speed 152 of the ball), the computerized device 106 can determine the time and place that the virtual fielder intersects with the trajectory of the ball (e.g., the outcome of the ball hit).

In step 206, the computerized device 106 generates a first virtual ball hit outcome 156 based upon the intersection outcome between the virtual fielder and the virtual endpoint location 157 of the hit ball. For example, based upon the fielder performance metrics and the calculated virtual endpoint location 157, if the intersection between the virtual fielder and the virtual endpoint location 157 of the hit ball occurs while the ball is in flight, then the computerized device 106 can detect the outcome 156 as being an out. If the computerized device 106 detects that an intersection of the virtual endpoint location 157 of the hit ball and virtual fielder occurs after the ball has struck the ground then, the computerized device 106 can utilize additional performance metrics to determine the outcome.

Figure 6:
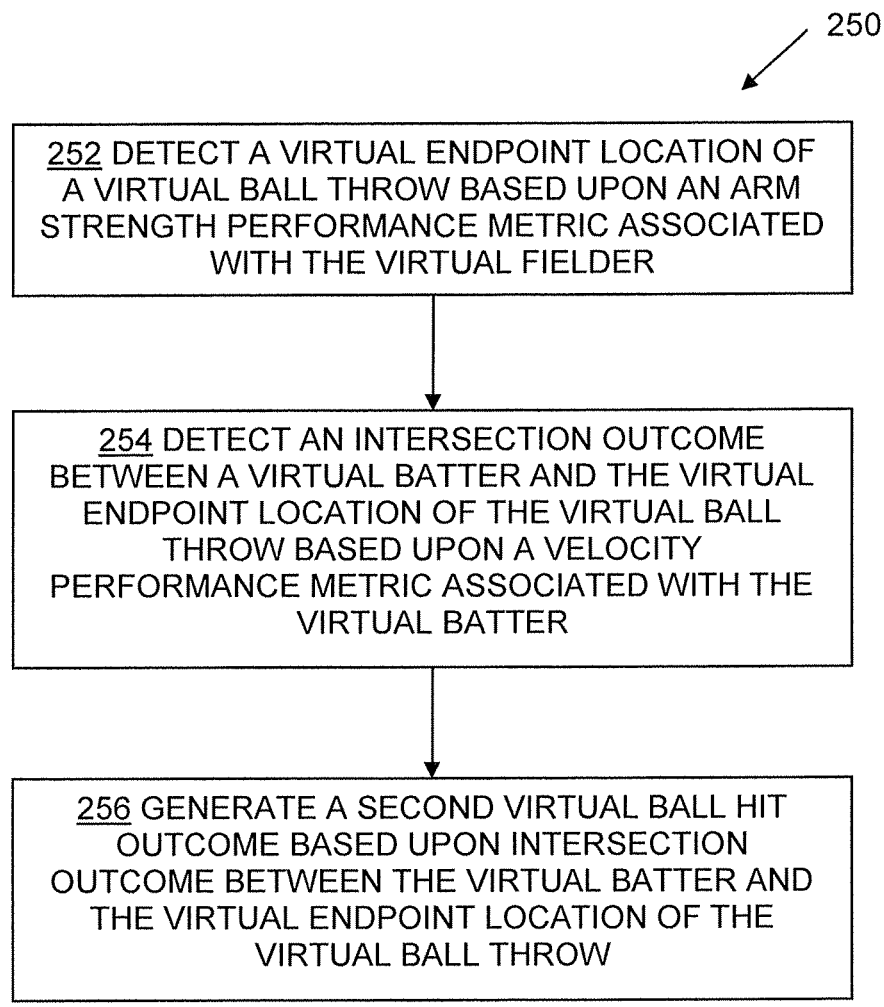
FIG. 6 is a flowchart of a procedure performed by the computerized device of FIG. 1, according to one arrangement.

In one arrangement, the system performance metrics 160 can affect the virtual ball hit outcome of a ball fielded by the virtual fielder. For example, FIG. 6 is a flowchart 250 illustrating a process performed by the computerized device 106 that takes the virtual fielder's arm strength into account, as well as the batters speed to first base, second base, third base or home plate.

In step 252, the computerized device 106 detects a virtual endpoint location 157 of a virtual ball throw based upon an arm strength performance metric associated with the virtual fielder. For example, the computerized device 106 can be configured with a database of fielder performance metrics associated with a virtual fielder, including the virtual fielder's arm strength, as indicated by a thrown ball velocity. Accordingly, the outcome of a thrown ball by a virtual infielder can depend on the time it takes for the infielder to reach the ball (e.g., as calculated by the computerized device 106 from the fielder's reaction time and speed) plus the velocity at which he throws the ball to first base (e.g., the arm strength performance metric). As indicated above, the computerized device 106 can access this data via the virtual fielder database, for example.

In step 254, the computerized device 106 detects an intersection outcome between a virtual batter and the virtual endpoint location 157 of the virtual ball throw based upon a velocity performance metric associated with the virtual batter. For example, the computerized device 106 can be configured with a database of batter performance metrics associated with the batter, such as the batter's base running speed. By knowing the distance between the virtual batter and the bases and the speed or velocity performance metric of the virtual batter (i.e., base runner) as taken from the database, the computerized device 106 can determine the time that the virtual batter can reach a base, such as first base, following a ball hit.

In step 256, the computerized device 106 generates a second virtual ball hit outcome based upon intersection outcome between the virtual batter and the virtual endpoint location 157 of the virtual ball throw. For example, if the intersection outcome between the virtual batter and the virtual endpoint location 157 of the virtual ball throw indicates that the ball thrown by the virtual fielder reaches first base before the virtual base runner then the second virtual ball hit outcome is an out. However, if the intersection outcome between the virtual batter and the virtual endpoint location 157 of the virtual ball throw indicates that the runner beats the virtual fielder's throw, then the second virtual ball hit outcome or ruling is a base hit.

While the performance metric 160 of the virtual fielder can be based upon speed and arm strength, a number of other factors can contribute to the virtual fielder performance metric 160. In one arrangement, the performance metric 160 associated with the virtual fielder is based upon the fielder's age. For example a 12 year old player will be typically slower than an 18 year old player. In one arrangement, the user 112 can select the age group he would like to compete against and input that age to the computerized device 106. Based upon the selected age group, the computerized device 106 can apply a corresponding performance metric 160 related to that age group to the exit ball velocity and trajectory of the virtual ball and provide a corresponding outcome of the hit (e.g., single, double, etc.) as outlined above. The performance metric 160, accordingly, factors in the slower running speed and arm strength of a relatively younger virtual fielder against the virtual batter to determine the likely outcome.

In another arrangement, the computerized device 106 applies a system performance metric 160 associated with the user or hitter to the exit ball velocity 152 and trajectory 154 of the ball 110. For example, the system performance metric 160 relates to the speed of the batter, based upon the age group the user selects for the batter. In use, before starting a hitting session the user 112 inputs the desired age group to the computerized device 106 to set the running speed of the fielders, as well as the virtual fielder's arm strength, for example. Based upon the particular, selected age group, the computerized device 106 can apply a corresponding performance metric 160 against the exit ball velocity and trajectory of the ball 110 and provide a corresponding outcome of the hit (e.g., was the user fast enough to make a single, double, etc.). In another arrangement, the computerized device 106 applies the same running speed to the virtual hitter/base runner when determining the outcome of a hit to minimize the ability of the users from selecting one age group for the fielders while selecting another age group for the base runners.

Returning to FIG. 1, in one arrangement, the system performance metrics 160 can be configured as an environmental performance metric 170 utilized by the computerized device 106 to adjust at least one of the ball trajectory 154 and exit ball velocity 152.

For example, the computerized device 106 is configured to apply environmental factors 170 to the exit velocity 152 and trajectory 154 of the virtual ball, or to the virtual ball hit outcome 156, to mirror a real-life outcome of the hit. These factors 170 can include wind direction, humidity level, temperature or other weather conditions, and altitude. In one example, the computerized device 106, can apply wind direction as the environmental factor 170 to adjust the virtual ball hit outcome 156 (e.g., adjust the horizontal and vertical distance of travel) for a particular hit ball. In another example, altitude can affect the drag coefficient on the ball following a ball strike. In such a case, a stadium located in higher altitudes like Denver will have an air density roughly 80% of stadiums located at sea level, such as at Miami. Accordingly, the computerized device 106 can adjust the horizontal and vertical distance of travel of the virtual ball such that a hit ball with a given exit ball velocity 152 and trajectory 154 will travel further in Denver compared to Miami. In one arrangement, the environmental factors 170 can be randomly generated by the computerized device 106 or can be provided by the user 112.

In one arrangement, the turf material of baseball field can act as an environmental factor 170 to affect the outcome of the virtual ball. For example, the computerized device 106 can account for the conditions of the playing field, as the environmental factors 170 to adjust the virtual ball hit outcome 156 of the virtual ball and simulate, for example, play on real grass or artificial turf. For example, certain baseball fields such as domed stadiums use artificial turf. In these cases, the ball will react in a different manner compared to play on real grass due to varying coefficient of friction between the two surfaces. In this case, the computerized device 106 can adjust the coefficient of friction according to the stadium's surface type and incorporate these parameters into the virtual ball hit outcome 156. The virtual weather conditions can be randomly generated by the computerized device 106 or can be provided by the user 112.

In another example, the geometry of the baseball field itself can act as an environmental factor 170 to affect the outcome of the virtual ball. For example, what might be a home run in Fenway Park may result in a fly ball out in Yankee Stadium. Accordingly, the user can select a particular baseball field and, based upon the geometry and dimensions of the baseball field, the computerized device 106 can apply the baseball field's geometry to the exit ball velocity and trajectory of the ball 110 to predict real-life outcome of the hit. For example, to enhance the user's experience, the computerized device 106 can place the virtual hitter inside a Major League Stadium via the display 120 and have the user's hits projected to the field dimensions of that specific ballpark. The computerized device 106 can also show the results of the hit via the display 120 (e.g., Home Run—410 ft.).

After the player 112 has hit the ball 110, the computerized device 106 can display the virtual ball hit outcome 156 on the output device 120. During operation and with reference to FIG. 4A, the computerized device 106 is configured to display the speed and location of the pitched ball (not shown) along with the speed 152, trajectory 154, and calculated distance of the batted ball (e.g., the virtual ball hit outcome 156) via the monitor 120. For example, within a second of impact, the monitor 120 can display a reasonable simulation of the path of the ball 110 traveling through the virtual stadium 132. This will give the batter an out-of-the-batting-cage view of where the ball would have landed had it not been confined by a screen seven feet from the batter's box. Additionally, the computerized device 106 and monitor 120 can display a virtual hitter (not shown), representing the user 112 inside a Major League Stadium, and show the player's hits projected to the field dimensions of that specific ballpark. Furthermore, in addition to the 3D view of the virtual field, the computerized device 106 can provide an overhead two dimensional (2D) view of the field as illustrated in FIG. 4B and can display the exact location of the batted ball.

With continued reference to FIG. 1, following the generation of multiple, virtual ball hit outcomes, the computerized device 106 is configured to generate a set of hitting session statistics 174 based upon the set of outcomes 156. Statistics 174 from hitting sessions provide the user with information that can be used to improve the player's performance (i.e., by showing deficiencies in the players swing, stance, etc.). For example, the computerized device 106 is configured to display, as the statistics 174, key performance indicators (KPIs) such as total distance, bat speed, and exit ball velocity for a single ball hit or for a set of ball hits. The computerized device 106 can also be configured to compile and display statistics 174 to the batter in real-time in order to provide the out-of-the-batting-cage results, as if the batter was playing a live game on an actual field. The computerized device 106 can also be configured to upload the statistics 174 to a secondary device 182, such as a database (e.g., either onsite or remotely hosted over the network 180) for analysis with software applications. These statistics 174 can be viewed per individual batting session or grouped together by date for a more comprehensive analysis. The statistics 174 can also be viewed for individual players or by groups or teams.

The computerized device 106 is configured to provide a variety of types of statistics 174 to the user to provide information regarding a variety of hitting metrics associated with the batter 112.

In one arrangement, the computerized device 106 of the batting simulator system 100 is configured to provide statistics associated with the virtual ball hit outcome 156 to the batter 112 in real-time. For example, as described above, the computerized device 106 is configured to determine if a ground ball is a single or an out or whether a fly ball is a home run or a long out to the right fielder. With this information, computerized device 106 can generate statistics 174 for each hitting session with individual hitting sessions compiled in a database for an entire season. As the game of baseball relies heavily on such statistics 174, this information is extremely valuable, as the player 112 can use the statistics 174 to perfect his swing mechanics or to chart his progress over a period of time.

In one arrangement, the computerized device 106 is configured to track and output statistics 174 related to pitch velocity, bat swing velocity, and batted ball velocity. For example, generally, the faster the batter swings the bat, the further the ball will travel. Accordingly, the computerized device 106 is configured to calculate and display the pitch speed, bat speed for each swing, and the exit velocity of the batted ball. By knowing the exit velocity of the batted ball as the output statistic 174, the batting simulator system 100 can keep track of hard hit balls over the course of the batting session or season. For example, line drives indicate that the batter is hitting the ball on the sweet spot of the bat and can increase or improve the batter's overall batting statistics. A hard hit can be defined by the elevation angle of the batted ball from the horizon and the height/distance ratio of the trajectory.

In one arrangement, the computerized device 106 is configured to track and output statistics 174 related to the pitch location with respect to the batter's strike zone. For example, as indicated above with respect to FIGS. 3A and 3B, the detectors 104 are configured to detect the motion of the pitched ball 110 within a set of fields of view 105. Within the volume defined by the fields of view 105 and with reference to FIG. 7, the computerized device 106 defines a strike zone 300 having a set of strike zone sections 302. For example, the area of the strike zone 300 is defined as the distance between the batter's shoulders and knees and the distance between the outer edges of home plate 107. While the strike zone 300 can have any number of sections 302, in one arrangement, the strike zone includes nine substantially square-shaped inner sections and four substantially L-shaped peripheral sections. During operation, by knowing the exact location of the ball 110 within the fields of view 105 relative to the strike zone 300 and by knowing the resulting virtual outcome of the ball following the hit (strike, single double, etc.), the computerized device 106 can generate ball hit statistics 174 on a per strike zone section basis.

Figure 7:
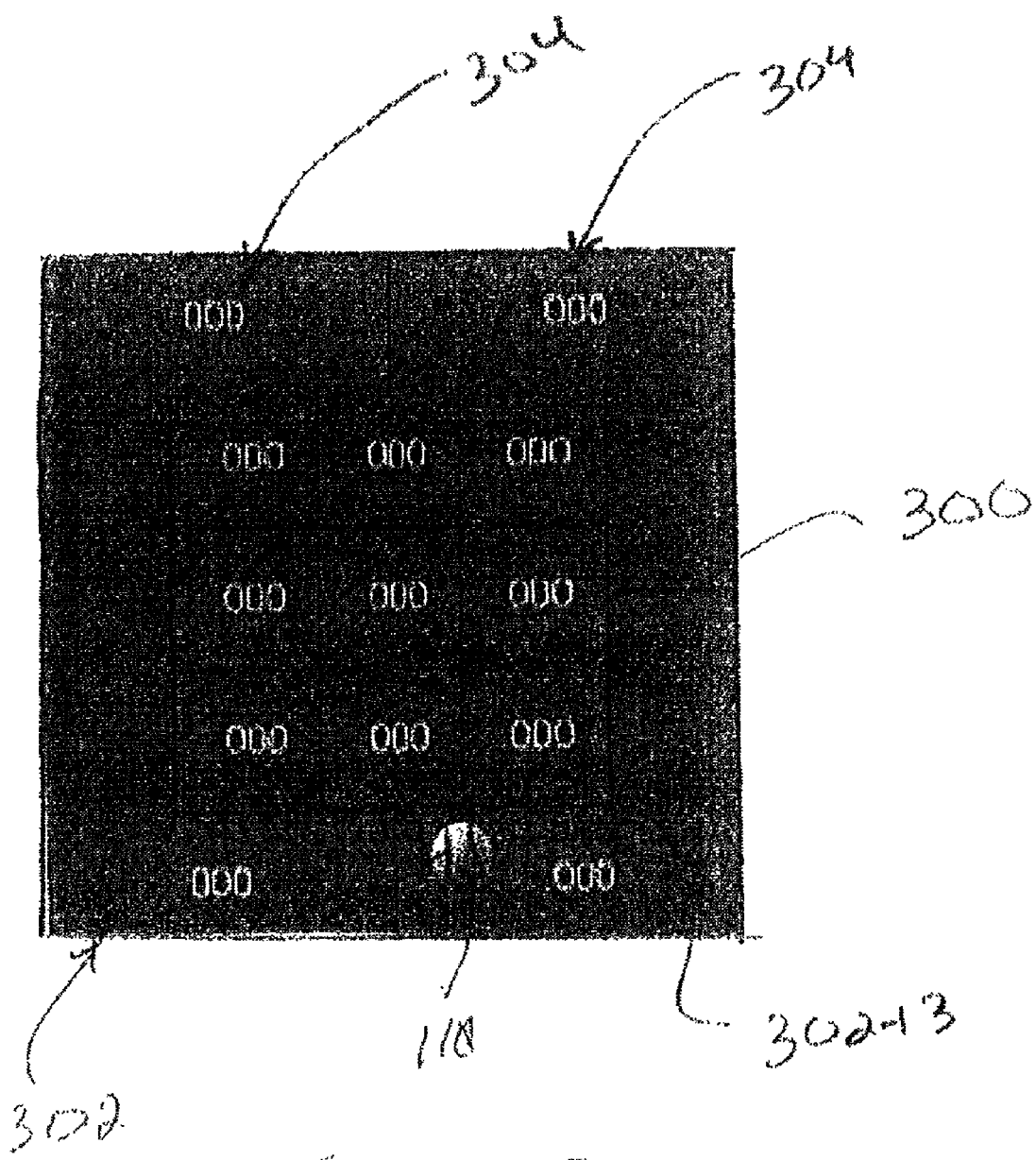
FIG. 7 illustrates an example of a strike zone grid generated by the batting simulator system of FIG. 1, according to one arrangement.

During operation, the computerized device 106 is configured to detect a location of the ball 110 associated with a ball hit within a strike zone section 302 of a strike zone 300. In one arrangement, based upon the measurement 138 received from the detector 104 relating to a ball hit location within the detector's field of view 105 as well as the defined strike zone 300, the computerized device 106 can detect the positioning of the hit ball within a strike zone section 302. For example, as indicated in FIG. 7, the computerized device 106 can detect the hit ball 110 as being located within the strike zone section 302-13.

Next, for each strike zone section of the set of strike zone sections 302, the computerized device 106 is configured to output a hit ball metric 304 associated with a ball hit by the batter. In one arrangement, the computerized device 106 can output the hit ball metric 304 for each strike zone section 302 via the output device or monitor 102 of the system 100. For example, the computerized device 106 can display the strike zone 300 and related strike zone sections 302 as well as the a hit ball metric 304 associated with each strike zone section 302.

While the hit ball metric 304 can be configured in a variety of ways, in one arrangement, the hit ball metric 304 relates to the corresponding batting average or average exit ball velocity per strike zone section 302. This will provide valuable information to the coach player as it identifies possible deficiencies in the player's swing and overall mechanics.

In one arrangement, the batting simulator system 100 provides, as part of the statistic output 174, spray charts, such as indicated in FIG. 4B. Spray charts are typically used by hitters 112 to determine hitting tendencies and identifying flaws in their mechanics or general hitting approach. By knowing the location and distance traveled for each hit, the system 100 can provide these charts by session or over the course of an entire season. The player 112 will have the ability to view singles, doubles, triples, home runs, and outs. They can also view statistics like fly ball to ground ball ratios. In one arrangement, when coupled with the tracking of pitch location with respect to a batter's strike zone, the computerized device 106 can generate spray charts for batted balls for each section 302 of the strike zone 300. This information is valuable as it can help determine if a player's approach to hitting an outside pitch is effective.

In one arrangement, the batting simulator system 100 can interact with other computerized devices over a network 180 to share statistics 174. As illustrated in FIG. 1, the computerized device 106 is configured to communicate over the network 180 with one or more server devices 182 which can host a website configured to serve as a portal for the player 112 to generate and review their statistics from a single batting session or form a collection of batting sessions representing an entire season. For example, the player 112 can upload statistics from the computerized device 106 to a server device 182 over time. The player 112 can later visit their personal statistics page of the website hosted by the server 182 to retrieve individual player reports. For example, the user can login to the website by entering their unique player ID and pass code. From there, the player 112 can download his individual statistics 174 for their last session, an entire season, or their career.

In one arrangement, the server 182 can provide data allowing the player 112 to analyze the location of ground balls or outs via spray charts, review average bat speed per session, and analyze their batting average over the course of the entire season. For example, the server 172 can report batting averages, singles, doubles, triples, home runs, slugging percentages, swing to miss percentages (SMP), number of hard hit balls, average pitch velocity, back to the player 112 and coach to monitor the player's progress. In addition to the batting statistics, the server 172 is configured to allow the player to define the spray charts by selecting to view singles, doubles, triples, home runs, outs, ground balls, fly balls or all of the above. By monitoring the player's bat speed for each hit during each batting session, the server 172 can provide charts that show the average and progression of bat speed over the course of time. In one arrangement, this data is provided to the player 112 for a fee.

In one arrangement, the website is configured to offer members collective statistical information. For example, the player 112 can review the overall hitting leaders in select age groups or review the latest hitting tips from a professional coach. Additionally, the website can provide additional collective statistical information, provided as follows.

In one arrangement, the website can be configured to provide a dashboard for regional or national batting leaders for certain categories (BA, HR's) of particular age groups. In one arrangement, the website can be configured to promote upcoming events (e.g. hitting clinics, home run derbies, sports venues, etc.) at customer sites. In one arrangement, the website can be configured with a live chat room or user blog where members can discuss a variety of topics including hitting techniques, swing mechanics, or the latest news from Major League Baseball.

Furthermore, in one arrangement, the website can be configured with advertising space for local or national retails stores and with player profile information to highlight members that are achieving success on and off the field. In one arrangement, the website can be configured to post interviews from coaches on the latest batting and training techniques. The information can be gathered directly from the coaches or from presentations at national conferences. In one arrangement, the website can be configured with a Facility Portal to allow organization of hitting clinics, home run derbies, and simulated games. The facility will need to enter in their account name and password. Once entered, they will be brought to a page where they can either start an event or gather group statistics on current or past events. Payment for the events will be processed via this portal. In one arrangement, the website can be configured with a Player Portal configured to serve as the entry point to gather the individual player statistics. The player 112 will need to enter in their username and password to gain access to their updated stats. The player 112 can purchase credits for future downloads via this portal or subscribe to our monthly or yearly packages.

As indicated above, the batting simulator system 100 is configured to collect exit ball velocity, ball trajectory, and outcome data and provide a virtual ball hit outcome of the hit as well as statistics relating to the batter's performance. In one arrangement, the batting simulator system 100 is configured to provide these functions as part of a game, such as a video game.

In one arrangement, the computerized device 106 is configured as a gaming module. For example, the computerized device 106 can be configured to execute a baseball defense based upon the virtual outcome 156 of a batted ball. With such a configuration, players and/or teams can utilize the system 100 to compete against the defense provided by the computerized device 106. In one arrangement, the computerized device 106 can execute a baseball defense algorithm, such as based on artificial intelligence gathered from generally accepted baseball strategies and tactics, to determine the correct defensive play for any given circumstance. For example, the computerized device 106 can determine if the defense should execute a double play with virtual base runners on first and second rather than prevent the virtual base runner on second base to advance to third.

In one arrangement, the system 100 is configured to run simulated games between two teams against a common virtual defense. The games can use an automated pitching machine or a live pitcher from the opposing team.

In one arrangement, the system 100 is configured to network simulated games, such as over the network 180 so that teams from different facilities can play against each other. For example, home run derby contests can be played between players (in same building or networked over the internet) in virtual stadiums.

While various embodiments of the innovation have been particularly shown and described, it will be understood by those skilled in the art that various changes in form and details may be made therein without departing from the spirit and scope of the innovation as defined by the appended claims.

As indicated above, the computerized device 106 is configured to provide a display of a virtual field 130, as illustrated in FIGS. 4A and 4B. In one arrangement, in addition to the virtual field 130, the computerized device 106 is configured to display virtual fielders that interact with a virtual hit ball after the user hits the ball 110 from the ball delivery apparatus 102.

As indicated above, using the fields of view 105 provided by the detector 104, the computerized device 106 is configured to detect a location of the ball 110 associated with a ball hit within a strike zone section 302 of a strike zone 300. In one arrangement, the computerized device 106 is also configured to utilize the fields of view 105 provided by the detector 104 to detect points of impact on user's bat (e.g., the sweet spot or at the portion of the bat having the largest diameter). A ball hit on the sweet spot of the bat typically travels faster than a ball hit from other locations of the bat, thus increasing the likelihood of a base hit. Accordingly, by detecting points of impact on user's bat and providing corresponding statistics to the user, the user can adjust his swing mechanics to hit the ball on the sweet spot of the bat and increase his hitting percentage.

In one arrangement, the system 100 is configured with the ability to add sensors on either the batter 112 to analyze actual swing mechanics (e.g. power 'L') or on the pitcher to analyze pitching motion. This could be done with either optical sensors using the same cameras of the detector 104 or sourceless inertial sensors.

As described above, based upon the exit ball velocity 152 and trajectory 154 of the hit ball 110, the computerized device 106 can determine a virtual endpoint location 157, such as within a virtual field. It should be noted that in the event that the batter 112 swings and does not contact the ball (e.g., following a ball strike), the computerized device 106 is configured to remain in operational mode ready to collect data from the next pitch or hit and display the results accordingly. Accordingly, the batting simulator system 100 does not require dedicated personnel for operation.

As described above, with reference to FIG. 1, the computerized device 106 is configured to detect both the incoming ball speed and ball trajectory, such as provided by the ball delivery apparatus 102, and the outgoing ball speed (i.e., exit ball velocity) and ball trajectory after the ball 110 is hit by the user 112. In one arrangement, such as when a human pitcher pitches the ball to the batter 112, the computerized device 106 associates the incoming ball speed and ball trajectory (e.g., location in the strike zone) with the virtual ball hit outcome 156 to develop pitcher-based statistics during a session. For example, based on the location of the ball within a strike zone and the ball's velocity, a pitcher can determine the percentage of pitches that resulted in line drives versus fly balls.

What is claimed is:
1. A batting simulator system, comprising:
a set of cameras; and
a computerized device disposed in electrical communication with the set of cameras, the computerized device configured to:
receive a set of measurements of a ball associated with a ball hit;
detect a trajectory and exit ball velocity of the ball based upon the set of measurements;
combine the detected trajectory and exit ball velocity with a system performance metric to generate a virtual ball hit outcome; and
output the virtual ball hit outcome on an output device,
wherein the system performance metric relates to at least one of a performance metric of a virtual fielder, a performance metric of a hitter that hits the ball that provides the set of measurements received by the computerized device, and an environmental factor associated with a virtual playing field, the system performance metric being provided to the computerized device prior to the ball being hit by the hitter, and
wherein the virtual ball hit outcome is a predicted real-life baseball outcome for the ball hit based on combining the detected trajectory, the exit ball velocity, and the system performance metric.

2. The batting simulator system of claim 1, wherein the system performance metric relates to the environmental factor and at least one of the performance metric of a virtual fielder and the performance metric of the hitter that hits the ball that provides the set of measurements received by the computerized device such that when combining the detected trajectory and exit ball velocity with the system performance metric to generate the virtual ball hit outcome, the computerized device is configured to adjust at least one of the ball trajectory and exit ball velocity based upon the environmental factor.

3. The batting simulator system of claim 2, wherein the environmental factor comprises at least one of wind direction, humidity level, altitude, temperature, and turf material.

4. The batting simulator system of claim 1, wherein computerized device is configured to:
generate a set of virtual ball hit outcomes based upon a corresponding set of ball hits; and
generate a set of hitting session statistics based upon the set of virtual ball hit outcomes.

5. The batting simulator system of claim 4, wherein, in response to generating the set of hitting session statistics based upon the set of virtual ball hit outcomes, the computerized device is configured to provide a statistic output of the set of hitting session statistics, the statistic output configured as at least one of a set of batting statistics and a spray chart.

6. The batting simulator system of claim 1, wherein the computerized device is configured to:
detect a location of the ball associated with a ball hit within a strike zone defining a set of strike zone sections; and
for each strike zone section of the set of strike zone sections, output a hit ball metric associated with a ball hit by the hitter.

7. The batting simulator system of claim 6, wherein when outputting the hit ball metric associated with the ball hit, the computerized device is configured to output at least one of a batting average and an average exit ball velocity for each strike zone section of the set of strike zone sections as the hit ball metric.

8. The batting simulator system of claim 1, wherein the computerized device is configured to:
receive a set of measurements of the ball associated with a ball pitch; and
detect an entrance velocity of the ball and an entrance trajectory of the ball based upon the set of measurements.

9. The batting simulator system of claim 1, wherein the system performance metric is configured as a velocity performance metric associated with the virtual fielder such that, when combining the detected trajectory and exit ball velocity with the velocity performance metric to generate the virtual ball hit outcome, the computerized device is configured to:
  detect a virtual endpoint location of the hit ball based upon the detected ball trajectory and exit ball velocity;
  detect a first intersection outcome between the virtual fielder and the virtual endpoint location of the hit ball based upon the velocity performance metric associated with the virtual fielder; and
  generate a first virtual ball hit outcome based upon the first intersection outcome.

10. The batting simulator system of claim 9, wherein the system performance metric is further configured as an arm strength performance metric associated with the virtual fielder and as a velocity performance metric associated with a virtual batter representing the hitter associated with the ball hit such that the computerized device is further configured to:
  detect a virtual endpoint location of a virtual ball throw based upon the arm strength performance metric associated with the virtual fielder;
  detect a second intersection outcome between a virtual batter and the virtual endpoint location of the virtual ball throw based upon the velocity performance metric associated with the virtual batter; and
  generate a second virtual bail hit outcome based upon the second intersection outcome between the virtual batter and the virtual endpoint location of the virtual ball throw.

11. The batting simulator system of claim 9, wherein, prior to combining the detected trajectory and exit ball velocity with the velocity performance metric to generate the virtual ball hit outcome, the computerized device is configured to retrieve the velocity performance metric of the virtual fielder from a database of fielder performance metrics associated with the virtual fielder.

12. The batting simulator system of claim 9, wherein the velocity performance metric associated with the virtual fielder comprises at least one of reaction time, running speed, and arm strength.

13. The batting simulator of claim 9,
  wherein detecting the first intersection outcome further comprises:
    detecting a first time indicating an amount of time for the hit ball to reach the virtual endpoint location of the hit ball, measured from a time of the ball being hit, the first time being detected based upon the detected ball trajectory and exit ball velocity; and
    detecting a second time indicating an amount of time for the virtual fielder to reach the virtual endpoint location of the hit ball, measured from the time of the ball being hit, the second time being detected based upon the velocity performance metric associated with the virtual fielder, and
  wherein the first intersection outcome is further detected based on the first time and the second time.

14. The batting simulator system of claim 13, wherein the system performance metric is further configured as an arm strength performance metric associated with the virtual fielder and as a velocity performance metric associated with a virtual batter representing the hitter associated with the ball hit such that the computerized device is further configured to:
  detect a virtual endpoint location of a virtual ball throw based upon the arm strength performance metric associated with the virtual fielder;
  detect a second intersection outcome between a virtual batter and the virtual endpoint location of the virtual ball throw based upon the velocity performance metric associated with the virtual batter by:
    detecting a third time indicating an amount of time for the hit ball to reach the virtual endpoint location of the virtual ball throw, measured from the time the first intersection outcome occurs, the third time being detected based upon the arm strength performance metric associated with the virtual fielder; and
    detecting a fourth time indicating an amount of time for the virtual batter to reach the virtual endpoint location of the ball throw, measured from the time of the ball being hit, the fourth time being detected based upon the velocity performance metric associated with a virtual batter; and
  generate a second virtual ball hit outcome based upon the second intersection outcome between the virtual batter and the virtual endpoint location of the virtual ball throw,
  wherein, if a combination of the third time and the time it takes for the first intersection outcome to occur as measured from the time the ball is hit is less than the fourth time, the second virtual ball hit outcome is an out, and if the combination of the third time and the time it takes for the first intersection outcome to occur as measured from the time the ball is hit is equal to or greater than the fourth time, the second virtual ball hit outcome is a hit.

15. The batting simulator system of claim 1, wherein at least one of the performance metric of a virtual fielder and the performance metric of a hitter is dependent upon at least one of an age, a gender, and a previously-determined real-world performance metric of the respective virtual fielder and hitter.

16. In a batting simulator system having a set of cameras and a computerized device disposed in electrical communication with the set of cameras, a method for detecting a result of the ball hit, comprising:
  receiving, by the computerized device, a set of measurements of a ball associated with a ball hit;
  detecting, by the computerized device, a trajectory and exit ball velocity of the ball based upon the set of measurements;
  combining, by the computerized device, the detected trajectory and exit ball velocity with a system performance metric to generate a virtual ball hit outcome; and
  outputting, by the computerized device, the virtual ball hit outcome on an output device,
  wherein the system performance metric relates to at least one of a performance metric of a virtual fielder, a performance metric of a hitter that hits the ball that provides the set of measurements received by the computerized device, and an environmental factor associated with a virtual playing field, the system performance metric being provided to the computerized device prior to the ball being hit by the hitter, and
  wherein the virtual ball hit outcome is a predicted real-life baseball outcome for the ball hit based on combining the detected trajectory, the exit ball velocity, and the system performance metric.

17. The method of claim 16, wherein the system performance metric relates to the environmental factor and at least one of the performance metric of a virtual fielder and the performance metric of the hitter that hits the ball that provides the set of measurements received by the computerized device such that combining the detected trajectory and exit ball velocity with the system performance metric to generate the virtual ball hit outcome comprises adjusting, by the computerized device, at least one of the ball trajectory and exit ball velocity based upon the environmental factor.

18. The method of claim 17, wherein the environmental factor comprises at least one of wind direction, humidity level, altitude, temperature, and turf material.

19. The method of claim 16, comprising:
generating, by the computerized device, a set of virtual ball hit outcomes based upon a corresponding set of ball hits; and
generating, by the computerized device, a set of hitting session statistics based upon the set of virtual ball hit outcomes.

20. The method of claim 16, comprising:
detecting, by the computerized device, a location of the ball associated with a ball hit within a strike zone defining a set of strike zone sections; and
for each strike zone section of the set of strike zone sections, outputting, by the computerized device, a hit ball metric associated with a ball hit by the hitter.

21. The method of claim 20, wherein outputting the hit ball metric associated with the ball hit, comprises outputting, by the computerized device, at least one of a batting average and an average exit ball velocity for each strike zone section of the set of strike zone sections as the hit ball metric.

22. The method of claim 16, comprising:
receiving, by the computerized device, a set of measurements of the ball associated with a ball pitch; and
detecting, by the computerized device, an entrance velocity of the ball and an entrance trajectory of the ball based upon the set of measurements.

23. The method of claim 16, wherein the system performance metric is configured as a velocity performance metric associated with the virtual fielder such that, combining the detected trajectory and exit ball velocity with the velocity performance metric to generate the virtual ball hit outcome comprises:
detecting, by the computerized device, a virtual endpoint location of the hit ball based upon the detected ball trajectory and exit ball velocity;
detecting, by the computerized device, a first intersection outcome between the virtual fielder and the virtual endpoint location of the hit ball based upon the velocity performance metric associated with the virtual fielder; and
generating, by the computerized device, a first virtual ball hit outcome based upon the first intersection outcome.

24. The method of claim 23, wherein the system performance metric is further configured as an arm strength performance metric associated with the virtual fielder and as a velocity performance metric associated with a virtual batter representing the hitter associated with the ball hit and further comprising:
detecting, by the computerized device, a virtual endpoint location of a virtual ball throw based upon the arm strength performance metric associated with the virtual fielder;
detecting, by the computerized device, a second intersection outcome between a virtual batter and the virtual endpoint location of the virtual ball throw based upon the velocity performance metric associated with the virtual batter; and
generating, by the computerized device, a second virtual ball hit outcome based upon the second intersection outcome between the virtual batter and the virtual endpoint location of the virtual ball throw.

25. The method of claim 23, wherein combining the detected trajectory and exit ball velocity with the velocity performance metric to generate the virtual ball hit outcome further comprises retrieving, by the computerized device, the velocity performance metric of the virtual fielder from a database of fielder performance metrics associated with the virtual fielder.

26. The method of claim 23, wherein the velocity performance metric associated with the virtual fielder comprises at least one of reaction time, running speed, and arm strength.

27. The method of claim 23,
wherein detecting the first intersection outcome further comprises:
detecting, by the computerized device, a first time indicating an amount of time for the hit ball to reach the virtual endpoint location of the hit ball, measured from a time of the ball being hit, the first time being detected based upon the detected ball trajectory and exit ball velocity; and
detecting, by the computerized device, a second time indicating an amount of time for the virtual fielder to reach the virtual endpoint location of the hit ball, measured from the time of the ball being hit, the second time being detected based upon the velocity performance metric associated with the virtual fielder, and
wherein the first intersection outcome is further detected based on the first time and the second time.

28. The method of claim 27, wherein the system performance metric is further configured as an arm strength performance metric associated with the virtual fielder and as a velocity performance metric associated with a virtual batter representing the hitter associated with the ball hit such that the method further comprises:
detecting, by the computerized device, a virtual endpoint location of a virtual ball throw based upon the arm strength performance metric associated with the virtual fielder;
detecting, by the computerized device, a second intersection outcome between a virtual batter and the virtual endpoint location of the virtual ball throw based upon the velocity performance metric associated with the virtual batter by:
detecting, by the computerized device, a third time indicating an amount of time for the hit ball to reach the virtual endpoint location of the virtual ball throw, measured from the time the first intersection outcome occurs, the third time being detected based upon the arm strength performance metric associated with the virtual fielder; and
detecting, by the computerized device, a fourth time indicating an amount of time for the virtual batter to reach the virtual endpoint location of the ball throw, measured from the time of the ball being hit, the fourth time being detected based upon the velocity performance metric associated with a virtual batter; and
generating, by the computerized device, a second virtual ball hit outcome based upon the second intersection outcome between the virtual batter and the virtual endpoint location of the virtual ball throw,
wherein, if a combination of the third time and the time it takes for the first intersection outcome to occur as measured from the time the ball is hit is less than the fourth time, the second virtual ball hit outcome is an out, and if the combination of the third time and the time it takes for the first intersection outcome to occur as measured from the time the ball is hit is equal to or greater than the fourth time, the second virtual ball hit outcome is a hit.

29. The method of claim 16, wherein at least one of the performance metric of a virtual fielder and the performance metric of a hitter is dependent upon at least one of an age, a gender, and a previously determined real-world performance metric of the respective virtual fielder and hitter.

30. A batting simulator system, comprising:
a set of cameras; and
a computerized device disposed in electrical communication with the set of cameras, the computerized device configured to:
receive a set of measurements of a ball associated with a ball hit;
detect a trajectory and exit ball velocity of the ball based upon the set of measurements;
combine the detected trajectory and exit ball velocity with a system performance metric to generate a virtual bail hit outcome;
output the virtual ball hit outcome on an output device;
detect a location of the ball associated with the ball hit within a strike zone defining a set of strike zone sections; and
for each strike zone section of the set of strike zone sections, output a hit ball metric associated with the ball hit by a hitter,
wherein the system performance metric relates to at least one of a performance metric of a virtual fielder, a performance metric of the hitter that hits the ball that provides the set of measurements received by the computerized device, and an environmental factor associated with a virtual playing field, the system performance metric being provided to the computerized device prior to the ball being hit by the hitter,
wherein the virtual ball hit outcome is a predicted real-life baseball outcome for the ball hit based on combining the detected trajectory, the exit ball velocity, and the system performance metric, and
wherein when outputting the hit ball metric associated with the ball hit, the computerized device is configured to output at least one of a batting average and an average exit ball velocity for each strike zone section of the set of strike zone sections as the hit ball metric.

31. A computer program product having a non-transitory computer-readable medium including computer program logic encoded thereon that, when performed on a controller in a batting simulator system, causes the controller to:
receive a set of measurements of a ball associated with a ball hit;
detect a trajectory and exit ball velocity of the ball based upon the set of measurements;
combine the detected trajectory and exit ball velocity with a system performance metric to generate a virtual ball hit outcome; and
output the virtual ball hit outcome on an output device,
wherein the system performance metric relates to at least one of a performance metric of a virtual fielder, a performance metric of a hitter that hits the ball that provides the set of measurements received by the controller, and an environmental factor associated with a virtual playing field, the system performance metric being provided to the controller prior to the ball being hit by the hitter, and
wherein the virtual ball hit outcome is a predicted real-life baseball outcome for the ball hit based on combining the detected trajectory, the exit ball velocity, and the system performance metric.

* * * * *